United States Patent
Kato et al.

[11] Patent Number: 5,369,736
[45] Date of Patent: Nov. 29, 1994

[54] TEXTURE MAPPING METHOD

[75] Inventors: Makoto Kato; Shinichiro Miyaoka; Makoto Nohmi, all of Kawasaki, Japan

[73] Assignee: Hitachi, Ltd., Tokyo, Japan

[21] Appl. No.: 155,242

[22] Filed: Nov. 22, 1993

Related U.S. Application Data

[63] Continuation of Ser. No. 549,086, Jul. 6, 1990, abandoned.

[30] Foreign Application Priority Data

Jul. 12, 1989 [JP] Japan .................................. 1-179646

[51] Int. Cl.⁵ .............................................. G06F 15/72
[52] U.S. Cl. ...................... 395/125; 395/130; 395/120; 382/19
[58] Field of Search ............. 395/125, 130, 119, 120, 395/136, 135, 161; 382/25, 19, 23, 27

[56] References Cited

U.S. PATENT DOCUMENTS

| | | | |
|---|---|---|---|
| 4,821,214 | 4/1989 | Sederberg | 395/120 |
| 4,885,702 | 12/1989 | Ohba | 395/119 |
| 4,888,713 | 12/1989 | Falk | 395/125 |
| 4,949,286 | 8/1990 | Ohba | 395/125 |
| 5,107,444 | 4/1992 | Wu | 395/119 |
| 5,175,806 | 12/1992 | Muskovitz et al. | 395/125 |

OTHER PUBLICATIONS

Ikeuchi et al., "Numerical Shape From Shading and Occluding Boundaries", *Artificial Intelligence*, vol. 17, 1981, pp. 141-184.

Rogers, "Procedural Elements for Computer Graphics", McGraw Hill Book Company, 1985, Chapter 5, Section 11, pp. 354-363.

*Primary Examiner*—Raymond J. Bayerl
*Attorney, Agent, or Firm*—Fay, Sharpe, Beall, Fagan, Minnich & McKee

[57] ABSTRACT

A texture mapping method projects a specified texture picture onto the surface of an object in another specified picture. Three-dimensional data on the surface shape of the object to be projected is not known previously. The three-dimensional data on the surface shape of the object is estimated on the basis of the data in the objective picture to attain the texture mapping.

12 Claims, 7 Drawing Sheets

ORIGINAL PICTURE

FIG. 6B

TEXTURE PICTURE

FIG. 6C

MAPPED PICTURE

FIG. 7A

TEXTURE COORDINATE SYSTEM

FIG. 7B

OBJECT COORDINATE SYSTEM

FIG. 7C

SCREEN COORDINATE SYSTEM

FIG. 8A

BASIC MODEL

FIG. 8B

MODIFICATION INSTRUCTION

FIG. 8C

MODIFIED MODEL

TEXTURE MAPPING METHOD

This is a continuation of application Ser. No. 07/549,086, filed Jul. 6, 1990, now abandoned.

BACKGROUND OF THE INVENTION

The present invention relates to a texture mapping method in a design simulator or the like.

In these years, simulation to know what the appearance of the object looks like when a specified texture is applied onto a surface of an object, has been increasingly carried out with the help of a computer. This simulation technique, which can easily study the interior decoration, appearance and so on of an article, is very effective compared with a prior art of actually manufacturing a model troublesomely to know the appearance of the object. This technique is called texture mapping in computer graphics and disclosed, for example, in a book entitled "Procedural Elements for Computer Graphics", Chapter 5, Section 11, David F. Rogers, McGraw-Hill Book Company, 1985 (which will be referred to merely as the prior art 1, hereinafter).

In the texture mapping explained in the prior art 1, it is assumed that a strict three-dimensional shape (configuration) on a surface of an object to be applied with a texture is previously known. When the three-dimensional shape data are used and mathematically calculated, it is possible to know how to distort the texture to allow the texture to be applied onto the object surface. In the case where the strict three-dimensional shape is not known, the shape has so far been. assumed to perform texture mapping and additional processing has been carried out on a trial and error basis while observing the resultant picture, in many cases.

In the prior art 1, in the event where a surface shape (configuration) of an object to be mapped is not known, it is impossible to realize favorable texture mapping. That is, the prior art 1 has had such a problem that, since a three-dimensional surface shape of an object in an ordinary picture is not known in many cases, the application range of such a prior art technique as mentioned above is restricted.

SUMMARY OF THE INVENTION

In view of the above circumstances, it is therefore an object of the present invention to provide a texture mapping method which can eliminate the above problem in the prior art, even when a surface shape of an object to be mapped is not known, which can minimize trial and error factors.

In accordance with the present invention, the above object is attained, when three-dimensional data relating to the surface shape of an object to be projected or mapped is not known previously, by estimating the three-dimensional data on the object surface shape on the basis of the data of the mapping picture to perform texture mapping.

In the texture mapping method of the present invention, there are three ways (1), (2) and (3) of estimating a three-dimensional shape on a surface of an object to be mapped, which follow.

(1) A shape is estimated from a shading method using the relationship between the gray level of an image and the surface gradient at each point on a surface of an object to be mapped. This method is summarized in a book entitled "Artificial Intelligence", Vol. 17, pp. 141-184, 1981, an article entitled 'Numerical Shape from Shading and Occluding Boundaries' written by K. Ikeuchi and B. K. B. Horn (which will be sometimes referred to as the prior art 2, hereinafter).

(2) On an original picture, a texture picture, or a picture obtained by mapping a texture onto a surface described by a supposed three-dimensional model on trial; an operator specifies a necessary number of point positions, the magnitude and orientations of the two-dimensional distortion of the points, or the magnitude and orientations of the three-dimensional distortion of the points in a three-dimensional coordinate system describing an objective surface to consider a supposed model for the objective surface and the specified point positions. In the embodiments of the present invention, the model for the objective surface is assumed to be, for example, elastic and to take the form minimizing the distortion energy of the elastic model according to the distortion specified by the operator.

(3) A combination method corresponding to a combination of the above methods (1) and (2). For example, an outer peripheral part of an objective surface is estimated based on the above method (2), while the interior unevenness is estimated based on the above method (1).

BRIEF DESCRIPTION OF THE DRAWINGS

FIGS. 6A to 8C are diagrams for explaining the contents of the processing of FIGS. 3 to 5.

DESCRIPTION OF THE PREFERRED EMBODIMENTS

An embodiment of the present invention will be detailed in the following by referring to the accompanying drawings. Explanation will be made as to an example wherein the present invention is embodied as a design simulator and the design simulation is directed, as an example, to the interior decoration of an automobile. In this case, the design simulation is carried out by photographing or taking the picture of the interior of the automobile and then modifying the texture of a seat part in the photographed picture image.

Figure 2:
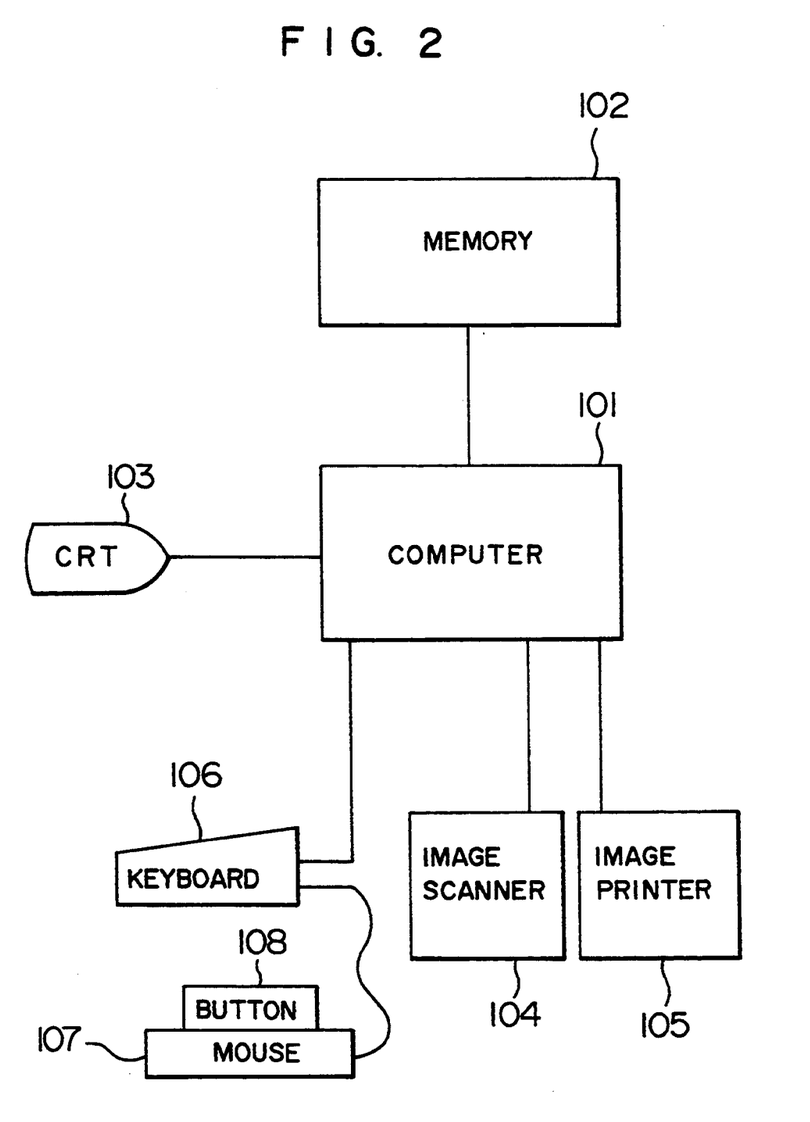
FIG. 2 shows an arrangement of a design simulator as an embodiment of the present invention.

Referring first to FIG. 2, there is shown an arrangement of the design simulator as an embodiment of the present invention, which simulator comprises a computer 101 for controlling the operation of various devices in the simulator, a memory 102 for storing therein digitized picture data, a CRT display unit 103 for displaying color picture images or characters thereon, an image scanner 104 through which a photograph is input into the computer 101.as digital picture data, an image printer 105 for outputting a printed image, a keyboard 106 through which an operator gives an instruction to the computer 101, and a mouse 107 through which the operator inputs planar position data into the computer by moving the mouse along a flat surface such as the top of a desk.

Explanation will be directed, in particular, to the mouse 107. A small arrow is indicated on the screen of the CRT display unit 103 under a control program of the computer 101 in accordance with a planar position designated by the mouse 107. By moving the mouse 107, the operator can freely shift the arrow on the screen of the CRT display unit 103. When the operator pushes or "clicks" a button 108 of the mouse 107, this causes position data pointed to by the arrow on the display screen of the CRT 103 to be sent to the computer 101 to be used in accordance with the operating software program of the computer. This clicking operation will be hereinafter referred to as "picking up" a location on the display screen.

The CRT display unit 103 is selected so that a picture can be color-displayed clearly on the display screen and the operator can observe the details of the view of the picture. These days commonly used is a CRT display unit which has specifications or performances of usually 1000 (vertical)×1000 (horizontal) or 1,000,000 pixels, red, green and blue each having 256 gray levels and a total of 16,700,000 colors on the display screen. Thus such a performance level of CRT display unit is employed in the present embodiment. As a matter of course, the image scanner 104 and image printer 105 are correspondingly selected to conform in performance to the CRT display unit 103.

Figure 1:
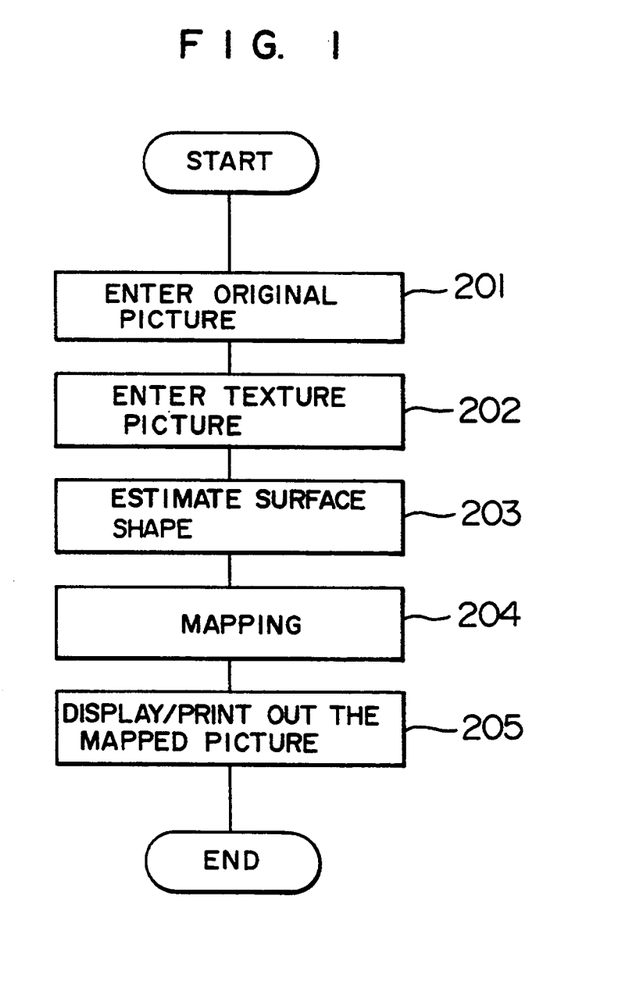
FIG. 1 is a flowchart for explaining the processing procedure of an embodiment of the present invention.
Figure 3:
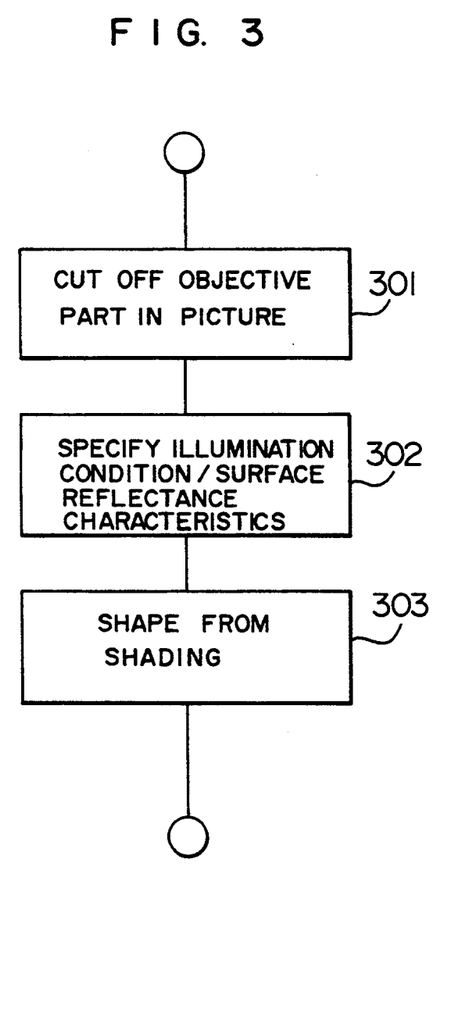
FIGS. 3 to 5 are flowcharts for explaining the details of a step 203 in FIG. 1.
Figure 4:
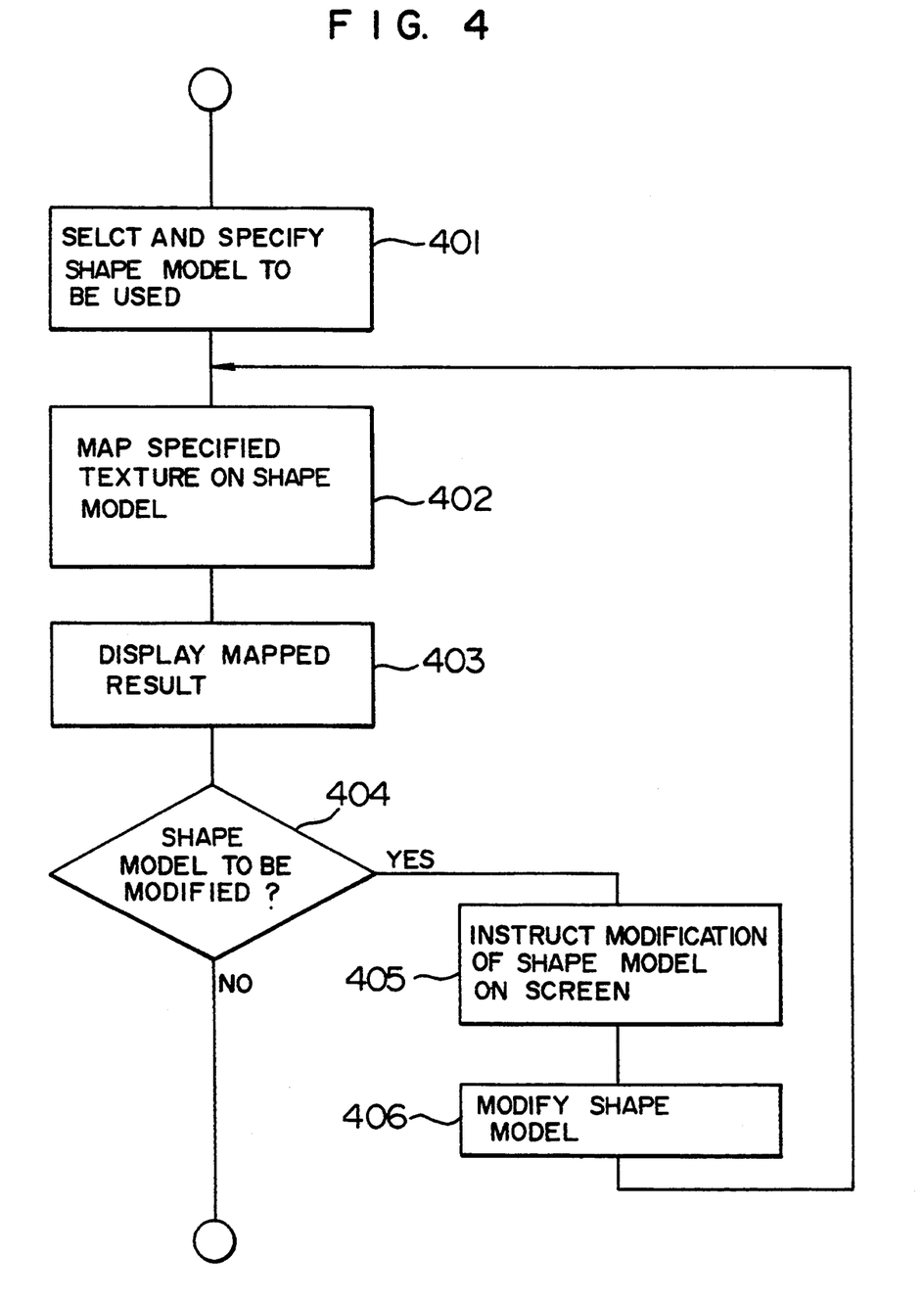
Figure 5:
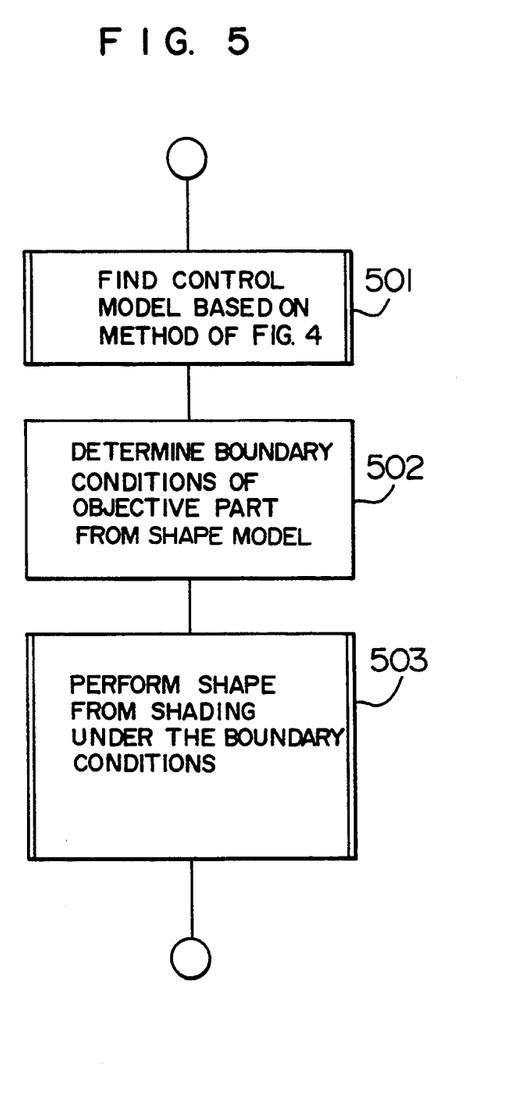
Figure 6A:
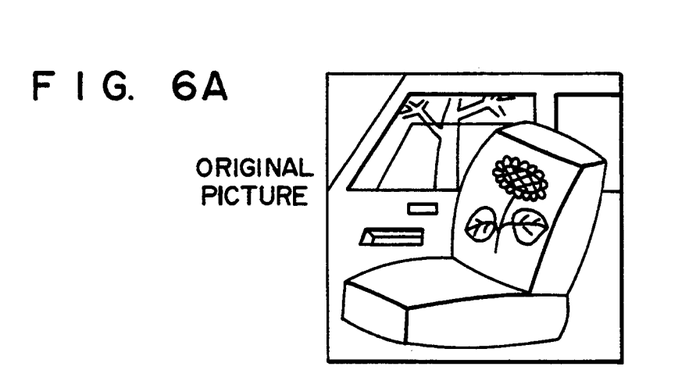
Figure 6B:
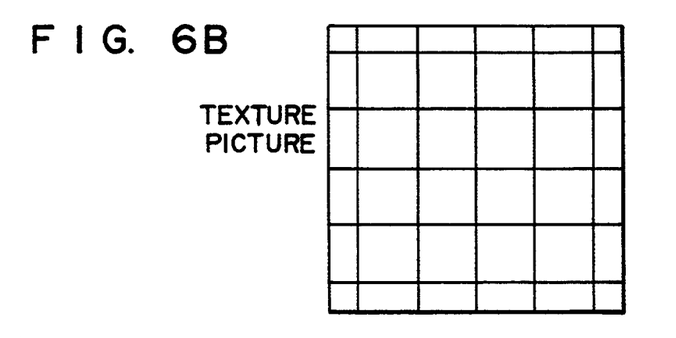
Figure 6C:
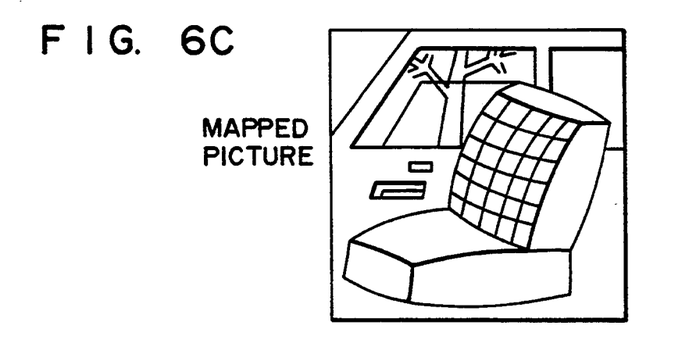
Figure 7A:
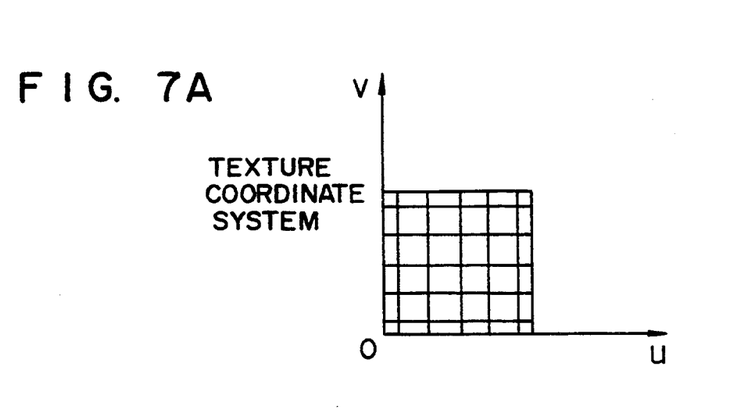
Figure 7B:
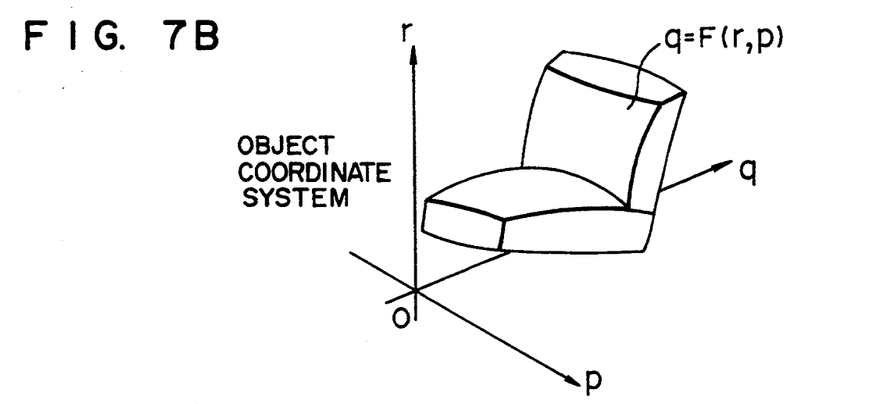
Figure 7C:
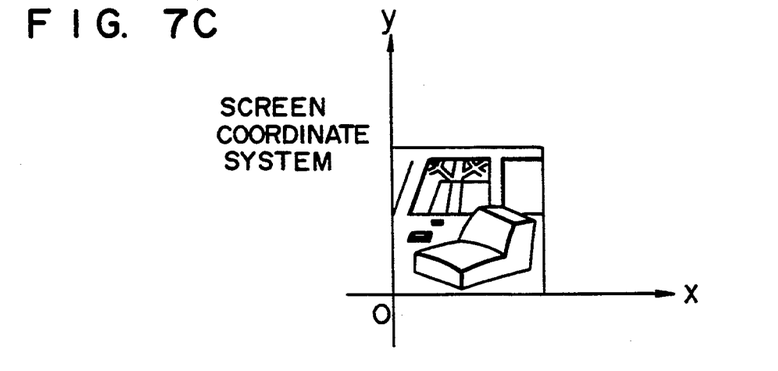

FIG. 1 is a flowchart showing the processing procedure of the present embodiment. FIGS. 3 to 5 are detailed flowcharts of a step 203 in FIG. 1, and FIGS. 6A to 8C are diagrams for explaining the contents of the above procedure. According to the texture mapping method, for example, a texture on the back part of a seat in such an original picture as shown in FIG. 6A is mapped into such a texture pattern as shown in FIG. 6C. The basic procedure is as follows. As shown in FIG. 7A, a texture described in a texture coordinate system is mapped on the back plane q=F(r, p) of the seat defined in an object coordinate system (refer to FIG. 7B) inherent in the object surface, and then transformed into such an image coordinate system as shown in FIG. 7C.

The feature of the present invention is to estimate, when the above plane q=F(r, p) is unknown, the plane. More specifically, in a step 201 of FIG. 1, the original picture image of FIG. 6A is entered through the image scanner 104 in FIG. 2. In a next step 202, a texture picture is entered. A surface detail of an object to be mapped is estimated in a step 203. For the mapping, several methods can be considered as mentioned above, which will be detailed later in connection with FIGS. 3 to 5.

Turning to FIG. 1, in a step 204, the texture is mapped onto the estimated surface detail to obtain such a mapped picture as shown in FIG. 6C. Then, in a step 205, the mapped picture is displayed on the screen of the CRT display unit 103 in FIG. 2 and also sent to the image printer 105 for its printout.

Shown in FIG. 3 in the form of a processing procedure flowchart is how to estimate a surface detail of an object to be mapped according to the aforementioned shape from shading method (1). The shape from shading method (1) can be applied for non-textured surfaces when the brightness (gray level) of the original picture is determined by the orientation of the surface. In a step 301, a mapping orientation is cut off out of the original picture. This can be realized by moving along and picking up the periphery of the seat. In a step 302, a surface-reflectance property and an illumination condition are specified. More concretely, for example, a perfectly diffusing plane is set for the surface-reflectance property while such a condition as illumination of parallel rays from above is set for the illumination condition.

In step 303, the aforementioned shape from shading processing is carried out. More in detail, this can be realized by carrying out the following processings based on the coordinate system (p, q, r) of FIG. 7B as disclosed in the aforementioned prior art 2.

$$f = \frac{-2\left(\frac{\partial r}{\partial p}\right)\left(\sqrt{1+\left(\frac{\partial r}{\partial p}\right)^2 + \left(\frac{\partial r}{\partial q}\right)^2} - 1\right)}{\left(\frac{\partial r}{\partial p}\right)^2 + \left(\frac{\partial r}{\partial q}\right)^2}$$

$$g = \frac{-2\left(\frac{\partial r}{\partial q}\right)\left(\sqrt{1+\left(\frac{\partial r}{\partial p}\right)^2 + \left(\frac{\partial r}{\partial q}\right)^2} - 1\right)}{\left(\frac{\partial r}{\partial p}\right)^2 + \left(\frac{\partial r}{\partial q}\right)^2}$$

where parameters f and g are quantities reflecting on the gradients of plane p and q directions and when the values of f and g at a given point on the surface are determined, the gradient of the plane is uniquely determined. When the light source and a viewing point are sufficiently far away therefrom, the gradient of the plane is associated with the brightness at that point in 1:1 relationship. When the desirable brightness at that point is called the reflectance map and denoted by R(f, g), the reflectance map is determined by the illumination and viewing point specified at the step 302. In this case, when the following calculations are iteratively carried out with use of an occluding boundary constraint and a smoothness constraint in accordance with the aforementioned prior art 2, $f_{ij}$ and $g_{ij}$ at all points can be found.

$$f_{ij}^{n+1} = f_{ij}^{*n} + \lambda[E_{ij} - R(f_{ij}^*, g_{ij}^*)]\frac{\partial R}{\partial f}$$

$$f_{ij}^{n+1} = g_{ij}^{*n} + \lambda[E_{ij} - R(f_{ij}^*, g_{ij}^*)]\frac{\partial R}{\partial g}$$

where $$f_{ij}^* = [f_{i+1j} + f_{ij+1} + f_{i-1j} + f_{ij-1}]/4$$

$$g_{ij}^* = [g_{i+1j} + g_{ij+1} + g_{i-1j} + g_{ij-1}]/4$$

parameter λ denotes a constant, $E_{ij}$ denotes the Drightness data of a pixel at a point (i, j), and n denotes the frequency of iterative calculation.

So long as a texture to be applied to the back part of the seat does not have irregular brightness variations, according to the above embodiment, a good surface shape can be estimated.

Figure 8A:
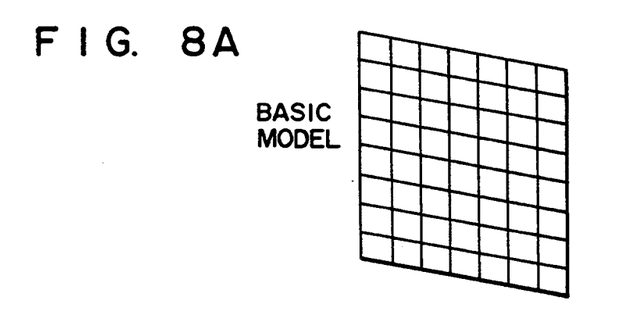

FIG. 4 shows a processing procedure flowchart for estimation of a surface shape of an object to be mapped utilizing the aforementioned prior art method (2). More concretely, in a step 401, a model to be applied to the back part of the seat is selected and specified. Since the seat back part is nearly planar, such a basic model as shown in FIG. 8A is specified. A grid shown in FIG. 8A means that three-dimensional coordinate values at grid points are designated in the object coordinate system of FIG. 7B. In a step 402, the texture of FIG. 6B is mapped onto the basic model. In a step 403, the mapped picture is displayed as overlapped with the original picture.

Figure 8B:
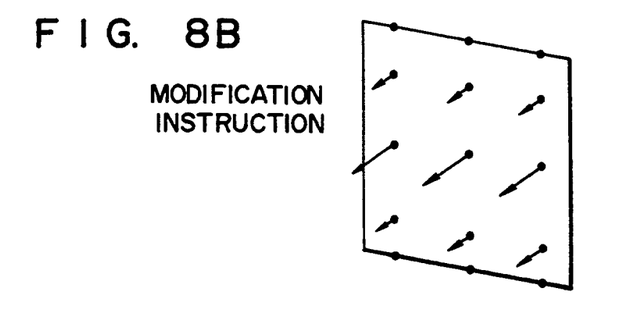

In a step 404, if the displayed result is satisfactory then no modification is carried out. When modification is desired, control goes to a step 405 to instruct the modification of the shape (contour) model on the display screen. That is, as shown in FIG. 8B, the operator picks up a proper number of points on the basic model and enters the modification directions and degrees of the picked points based on the object coordinate system through the keyboard 106 of FIG. 1. In a next step 406, the shape model is modified according to picture.

Figure 8C:
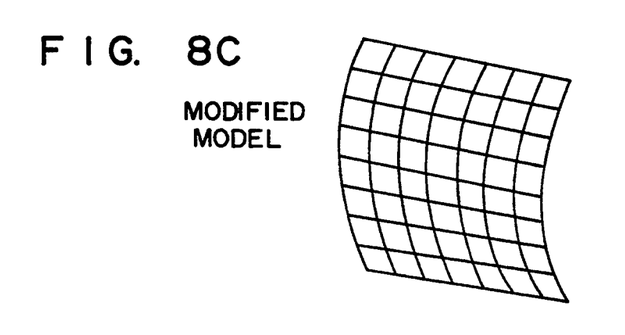

In the illustrated example, the model with respect to the objective surface is considered to be, for example, elastic and shape modification is made so that the distortion energy of the elastic model is minimized. The elastic energy is defined as follows. That is, assuming $S_{ij}$ denotes a position vector at a grid point (i, j) (i:column, j:row) of the basic model of FIG. 8A and $S'_{ij}$ denotes a position vector at a grid point of a modified model of FIG. 8C, then a distortion vector $U_{ij}$ can be defined as follows.

$$\vec{U}_{ij} = \vec{S}'_{ij} - \vec{S}_{ij}$$

where $S_{ij}$ is known and thus when $U_{ij}$ is determined, $S'_{ij}$ or the modified model can be determined.

The elastic energy E is expressed as follows.

$$E = (k/2) \sum_i \sum_j \{(\vec{U}_{i+1,j} - \vec{U}_{ij})^2 + (\vec{U}_{ij+1} - \vec{U}_{ij})^2\}$$

where k denotes an elastic constant. Such a distortion vector $U_{ij}$ as to minimize the elastic energy E is found under such a condition that $U_{ij}$ should pass through the modification instruction points in FIG. 8B. Thereafter, control goes back to the step 402 to repetitively map the texture of the modified model until a favorable result is obtained.

In the above embodiment, the elongation of the texture to be applied to the back part of the seat has been neglected, but practically a good surface shape estimation can be realized. Although the shape model has been treated as an elastic model to modify the shape model in the step 406, it goes without saying that the shape model may also be approximated as a spline surface, a curved surface defined by a polynomial, a hyperellipsoidal surface or the like which passes through the points specified according to the modification instruction.

FIG. 5 is a flowchart showing a processing procedure for estimating the surface shape of an object based on the aforementioned combination method (3).

In more detail, in a step 501, a shape model is modified and determined according to the method of FIG. 4. In a step 502, the boundary conditions of outer peripheral part of the objective surface are determined on the basis of the determined model. In a step 503, the shape from shading shown in FIG. 3 is carried out under the above determined boundary conditions.

Since the present embodiment has merits of both the aforementioned methods (1) and (2), sophisticated texture mapping with a less number of trial-and-error factors can be realized.

As will be appreciated from the description of the foregoing embodiments, in the case where the original picture itself has a regular pattern for example, the surface shape can be estimated based on the distortion of the original picture in the step 203 of FIG. 1. For example, when the pattern of the seat is initially of a grid, the distortion of the grid in the original picture may be made to coincide with the degree of distortion (mapping) of the texture.

As has been disclosed in the foregoing, in accordance with the present invention, there is provided a texture mapping system for projecting a specified texture picture onto the surface of an object in another specified picture, wherein, when a three-dimensional data on the surface shape of the object to be projected is not known previously, the three-dimensional data on the surface shape of the object is estimated on the basis of the data in the objective picture to attain the texture mapping. As a result, texture mapping with a less number of trial-and-error factors can be realized.

What is claimed is:

1. A texture mapping method comprising the steps of:
    inputting data of an original picture obtained by photographing a scene and data of a texture picture to be mapped on the original picture;
    estimating three-dimensional coordinates x,y,z which express a surface shape of a predetermined part in the original picture on the basis of the data of the original picture in accordance with an operator's instruction data;
    modifying the estimated surface shape three-dimensionally in a three-dimensional space by designating a three-dimensional vector modification of a three-dimensional coordinate point on the estimated surface shape;
    mapping the data of the texture picture onto the estimated surface shape; and
    outputting picture data obtained in the mapping step, whereby the operator can visually evaluate the estimated surface shape.

2. A texture mapping method as set forth in claim 1, wherein said estimating step is carried out by using a shape generated from a shading method using a relationship between picture brightness and surface gradient.

3. A texture mapping method as set forth in claim 1, wherein said estimating step includes a step of conforming a model in accordance with an operator's instruction.

4. A texture mapping method as set forth in claim 3, wherein said shape model is modeled to have an elastic surface, and said modifying step is carried out by modifying the model to have such a shape so as to minimize an elastic energy of the model.

5. A texture mapping method as set forth in claim 3, wherein said conforming step is carried out by modifying the surface of the shape model to approximate one of a spline surface, a curved surface defined by a polynomial, and a hyperellipsoidal surface which passes through points specified in the modification instruction.

6. A texture mapping method as set forth in claim 1, wherein said estimating step is carried out, with respect to data of the three-dimensional surface shape, by modifying a boundary of the surface shape in accordance with a modification request input by the operator and by modifying an inside unevenness of the surface shape based on a shape generated by a shading method using a relationship between gray levels of the picture and a surface gradient.

7. A texture mapping method as set forth in claim 1, wherein said estimating step is carried out by finding data of the three-dimensional surface shape with use of distortion of a regular pattern present on the surface.

8. A texture mapping method according to claim 1, wherein said estimating step is carried out by using a relationship between picture brightness and surface gradient.

9. A texture mapping method according to claim 1, wherein said estimating step is carried out by representing a two-dimensional grid, which is a projection of a three-dimensional grid on the computer display, overlaid on the original picture, and by modifying the three-dimensional grid position on the computer display.

10. A texture mapping method according to claim 9, wherein said estimating step includes a step of conforming a shape model in accordance with an operator's instructions and wherein said shape model is modeled to have an elastic surface, and said conforming step is carried out by modifying the model to have such a shape so as to minimize an elastic energy of the model.

11. A texture mapping method according to claim 9, wherein said estimating step includes a step of conforming a shape model in accordance with an operator's instructions and wherein said conforming step is carried out by modifying the surface of the shape model to approximate one of a spline surface, a curved surface defined by a polynomial, and a hyperellipsoidal surface which passes through points specified in the modification instruction.

12. A texture mapping method according to claim 1, wherein said estimating step is carried out, with respect to coordinate data representing the three-dimensional surface shape, by representing a two-dimensional boundary of an objective surface, which is a projection of a three-dimensional surface, by modifying a three-dimensional boundary, and by modifying an inside unevenness of the surface based on a shape generated by a shading method using a relationship between gray levels of the picture and a surface gradient.

* * * * *